United States Patent [19]
Chesterfield et al.

[11] Patent Number: 5,505,396
[45] Date of Patent: Apr. 9, 1996

[54] ROTATABLE-SPOOL FISHING REELS

[75] Inventors: Richard A. Chesterfield; Keith A. Duffelen, both of Cornwall, United Kingdom

[73] Assignee: British Fly Reels Limited, United Kingdom

[21] Appl. No.: 305,689

[22] Filed: Sep. 13, 1994

[30] Foreign Application Priority Data

| Nov. 23, 1993 | [GB] | United Kingdom | 9324053 |
| Feb. 1, 1994 | [GB] | United Kingdom | 9401841 |

[51] Int. Cl.⁶ .................................................. A01K 89/033
[52] U.S. Cl. ............................................. 242/298; 242/317
[58] Field of Search ................................. 242/282, 295, 242/306, 317, 318, 301

[56] References Cited

U.S. PATENT DOCUMENTS

| 2,551,309 | 5/1951 | Allison | 242/295 |
| 2,993,660 | 7/1961 | Parks | 242/295 |
| 3,708,137 | 1/1973 | Jones | 242/298 |
| 3,989,204 | 11/1976 | Lemery | 242/295 |
| 4,168,041 | 9/1979 | Mooseberg | 242/295 |
| 4,515,325 | 5/1985 | Ito | 242/295 |
| 4,750,687 | 6/1988 | Slevert et al. | 242/295 |
| 4,832,278 | 5/1989 | Sugeta | 242/282 |
| 4,966,336 | 10/1990 | Humble et al. | 242/295 |
| 5,199,682 | 4/1993 | James | 242/295 |

FOREIGN PATENT DOCUMENTS

| 1531678 | 11/1978 | European Pat. Off. . |
| 1230281 | 4/1971 | United Kingdom . |
| 2096441 | 10/1982 | United Kingdom . |
| 2125262 | 3/1984 | United Kingdom . |

*Primary Examiner*—Katherine Matecki
*Attorney, Agent, or Firm*—Beveridge, DeGrandi, Weilacher & Young

[57] ABSTRACT

A rotatable-spool fishing reel has an arrangement such as a brake or clicker for influencing the rotation of the spool. A unidirectional coupling is provided between the line spool and the brake or clicker arrangement, so that the arrangement influences the spool's rotation only in one direction. The coupling is provided by a disk having unidirectional resilient pawls projecting from both of its faces, such that the selected rotational sense for influencing the spool rotation can be reversed by inverting the disk. The disk can be made as a one-piece molding in plastics, with its periphery adapted for engagement by the brake or clicker arrangement. The back of the spool has an annular series of abutments to engage the opposing pawl of the coupling element. The reel backplate may also have an annular series of abutments, to engage the opposite pawl and prevent rotation of the coupling element when the spool rotation is not to be influenced.

18 Claims, 5 Drawing Sheets

ROTATABLE-SPOOL FISHING REELS

FIELD OF THE INVENTION

This invention relates to rotatable-spool fishing reels.

BACKGROUND OF THE INVENTION

A typical reel has a reel body for fixing to a fishing rod by some appropriate fitting, with a spool for holding fishing line mounted rotatably and removably on the reel body, typically on a spindle projecting axially from a backplate of the reel body. In particular we are concerned with fly reels, in which typically a manual crank arrangement for rotating the spool is provided as a handle directly on a front plate of the spool.

Reels of the type described conventionally include control means for influencing the rotation of the spool relative to the body. Adjustable brakes and clickers are usual. A known construction uses a control coupling element—typically a disk or ring—which rotates with the spool, and a spool rotation control arrangement or control feature on the body—typically a friction brake or clicker, which may be adjustable—which applies a control force to the control coupling element so as in turn to influence the spool's rotation. A braking effect is usually desired for only one sense of spool rotation, i.e. when line is being stripped from the spool. It is therefore normal practice to couple the control coupling element to the spool through a unidirectional coupling—typically a ratchet or other pawl-based mechanism—so that they are constrained to rotate together (thereby braking the spool) in one rotational sense only.

Right- and left-handed anglers use their reels oppositely mounted, so it is desirable for a reel to allow selection of the sense in which that constrained rotation occurs.

Our own earlier GB-A-2096441 describes such a reversible system, in which a brakable element (a disk), its unidirectional ratchet coupling mechanism and also the components for braking it are housed together in a unitary cassette, which is sandwiched between the spool and reel backplate with a simple locating engagement for each. The braking sense is switched by taking out the spool and turning the cassette over. This is very easy to use, but the cassette with its internal mechanisms is a complex and hence expensive component.

SUMMARY OF THE INVENTION

An object of the invention is to provide novel reel constructions providing for sense-determined spool control, with reversibility of the selected rotational sense, and in particular with a simple and economic construction.

A more specific object is to provide a coupling element as a discrete invertible element which locates between the spool and body, coaxially with the spool, and which has on each of its axially-directed sides or faces respective means for making a sense-selective rotational coupling engagement with complementary means of the spool when that side faces the spool. The nature of the engagement means on the invertible control coupling element defines selectively the particular sense in which rotational coupling occurs, on interaction with the complementary means on the spool. The engagement means on the spool, however, can couple in either rotational sense. The engagement means on the opposite sides of the coupling element are oppositely sense selective when facing the spool, so that the direction of constrained co-rotation is reversible by inverting the coupling element, which can be discretely removed from and replaced in the reel.

A preferred object is to provide that complementary engagement means of the spool and coupling element are one or more axially resiliently-retractable pawls on one of those components, engageable rotationally with one or more corresponding fixed abutments e.g. one or a set of projections or recesses, of the other component. Preferably the pawls are the sense-determining element of the coupling and so are provided on the invertible coupling element, with one or more pawls projecting axially from each of the opposite sides thereof.

A preferred construction of the invertible coupling element has axially-projecting pawls or at least their springs constructed integrally with a body of the element, so as to deform relative to the body in operation by bending. Discrete pawl springs may then not be needed, and a one-piece element is extremely simple to make and to handle. It may be made as a flat piece in which the projecting ends of the pawls overlie correspondingly-shaped cut-outs of the body of the element, providing clearance for resilient retraction of the pawls by bending. The body may be molded with the pawls integral, or formed from sheet material e.g. metal with the pawls formed by punching or cutting. The body may be made from relatively non-springy material such as aluminum, with pawls of relatively springy material such as spring steel or beryllium copper attached to the body.

A pawl spring can be provided by a circumferentially and axially projecting cantilevered limb formed at or as part of a circumferentially-extending web portion of the element.

For the preferred utility as a braking wheel, the coupling element desirably has a peripheral friction surface for engagement by a brake on the body e.g. a brake shoe or pad. Alternatively, the coupling element might have a toothed periphery for meshing with a further wheel which is subject to the brake, and/or for engagement by a spring clicker pawl.

Where the coupling element has the pawls, corresponding detents on the spool and reel body can be made simply e.g. as circumferential series of radially-extending ribs, teeth or other suitable abutments which may be formed e.g. by molding or by casting-in. These abutments are desirably non-specific as to their rotational coupling direction. So, simple symmetrical ribs suffice.

Another possibility is a construction for a resiliently retractable pawl comprised in the invertible coupling element, the pawl comprising a resiliently flexible pawl neck, e.g. in the form of a leaf spring, fixed at one end to the body of the coupling element and acting at the other end on an enlarged, non-deforming pawl head. The pawl head is seated in an axially-extending guide recess of the body which guides axial movement of the pawl head by restricting its freedom to move perpendicular to the axial direction. The guide recess preferably has radially and circumferentially directed guide walls, most preferably surrounding the pawl head to the extent that, over its working range of axial movement, the guide recess prevents it from any movement, in any direction transverse to the axial direction, far enough to damage the pawl neck. A suitable guide recess e.g. in the form of a channel with axially-extending guide walls, is conveniently formed in the body of the element e.g. by molding.

A further proposal is that a pawl of the invertible coupling element, having a pawl leaf spring fixed to or formed integrally with a body of the element, has a separately-formed pawl head. This increases design flexibility for the pawl head. The separately-formed pawl head may be attached to the spring, and/or may be retained relative to the body by other means. It may operate in a guide recess, as in the first proposal above. It may be retained in the coupling element by trapping between the spring and one or more opposing abutments of the coupling element body.

More generally, however, whether in a one-piece or other construction, the pawl head may have abutment projections to co-operate with adjacent abutments of the coupling element body and/or reel and backplate surfaces to inhibit buckling due to compression along the length of circumferentially extending pawl springs which support the pawl heads.

BRIEF DESCRIPTION OF THE DRAWINGS

Preferred embodiments of the invention are now described by way of example, with reference to the accompanying drawings in which.

DETAILED DESCRIPTION OF THE PREFERRED EMBODIMENTS

Figure 1:
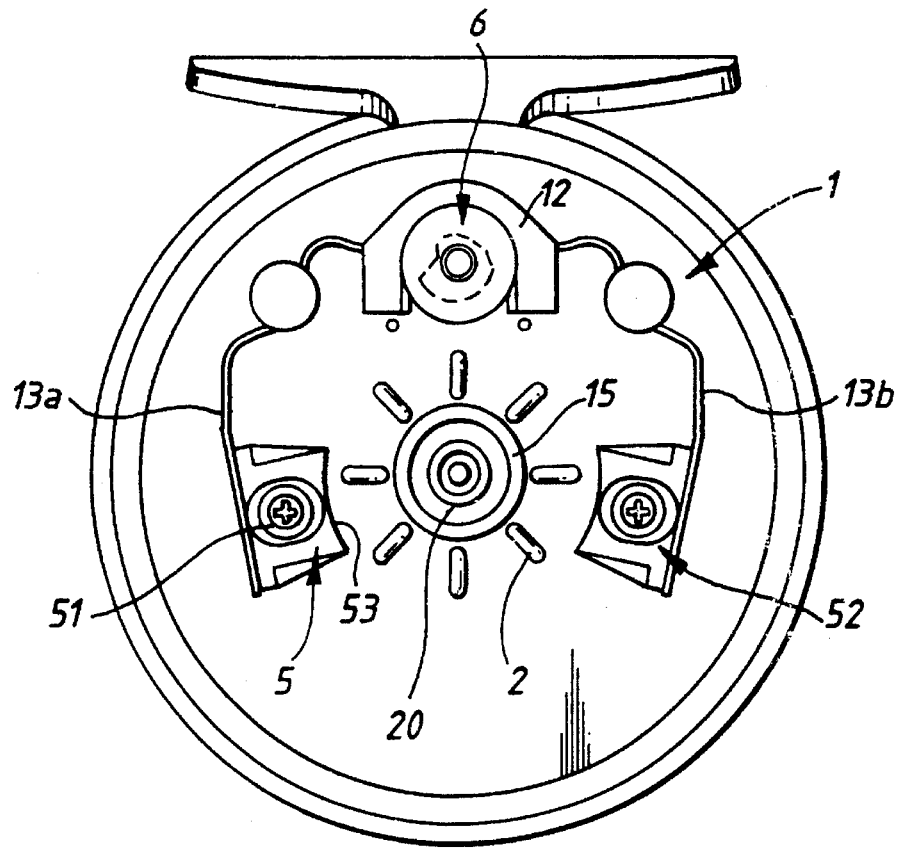
FIG. 1 is a front view of the interior of a fly reel body backplate in a first embodiment.

FIG. 1 shows the body of a reel embodying the invention, looking at the backplate 1 with the spool removed. Parts of the body other than the backplate 1 may be conventional. A conventional spindle 20 projects from the centre of the backplate 1. At the base of the spindle, the backplate has an integral circular boss 15. Around the boss 15 is an annular array of equally-spaced projections 2, which in this embodiment are radially elongate ribs. Each rib has a symmetrical cross-section. In this embodiment, the ribs have a smoothly curved surface contour, and the body plate surface between the ribs is flat. Eight ribs 2 are shown, but any number of projections may be selected as appropriate for the purposes to be further elucidated below.

An adjustable spring-actuated brake is also provided on backplate 1. A brake pad or shoe 5 is secured to the backplate 1, with some radial freedom of movement, by a screw 51 and urged inwardly by a spring 13a. A cam-type adjuster 6,12 can be used to shift the other end of the spring 13a, to control the pressure applied. In this embodiment, a second brake shoe 52 is disposed symmetrically opposite the first, with a corresponding spring 13b connected to the same cam adjuster 6 via the radially-slidable cam follower 12 which mounts both springs 13a,b. Each of the brake shoes 5,52 has a circularly arcuate inner braking surface 53, directed at the boss 15.

Figure 2:
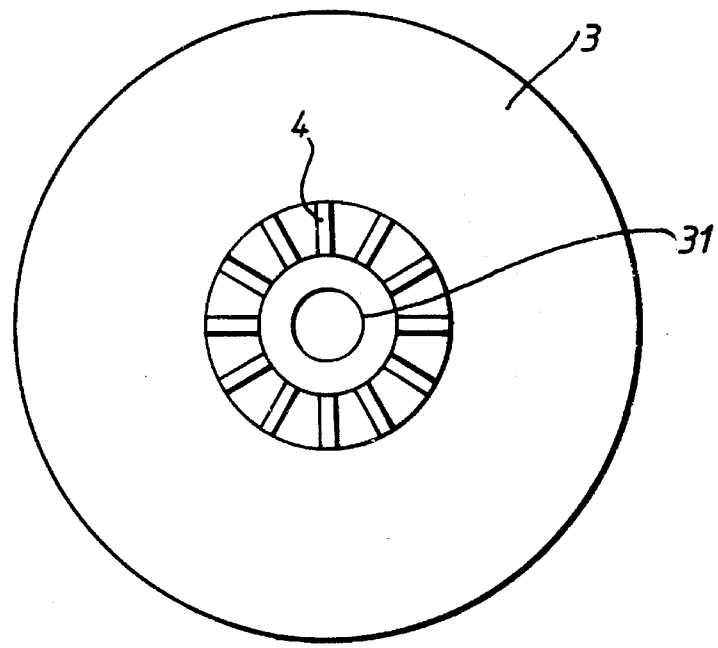
FIG. 2 shows the rear surface of a corresponding spool.

With reference to FIG. 2, the spool 3 also has a series of equally-spaced projections 4 arranged around its central hole 31. The projections 4 are in radial register with the projections 2 on the backplate 1. In this embodiment, the projections 4 are radially-extending ribs, symmetrical in cross-section (like the backplate ribs 2) and therefore presenting a similar profile viewed in either circumferential sense.

Figure 4:
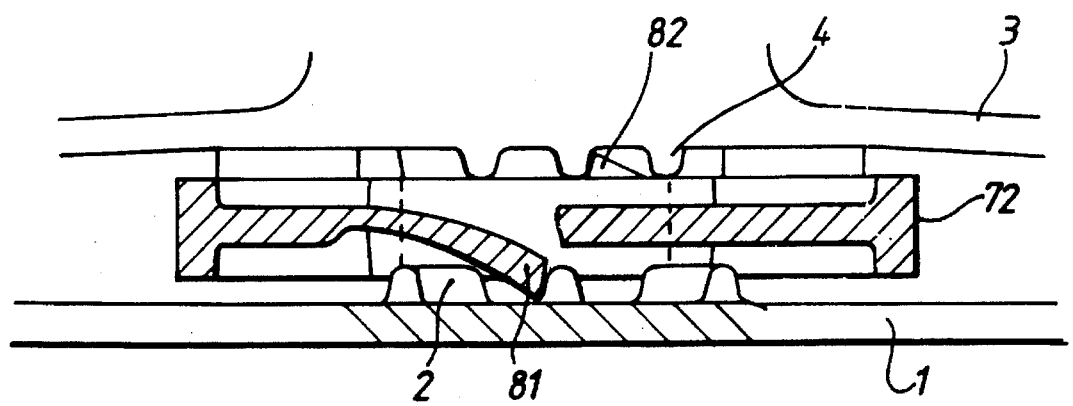
FIG. 4 is a section through the braking disk at IV—IV in FIG. 3.

FIG. 4 shows how the respective sets of ribs 2,4 of the backplate 1 and spool 3 oppose one another in the assembled reel. The spool ribs 4 are more closely angularly spaced than the backplate ribs 2; in this embodiment there are twelve. The spool ribs 4 are also less high than the backplate ribs, for reasons explained later.

Figure 3:
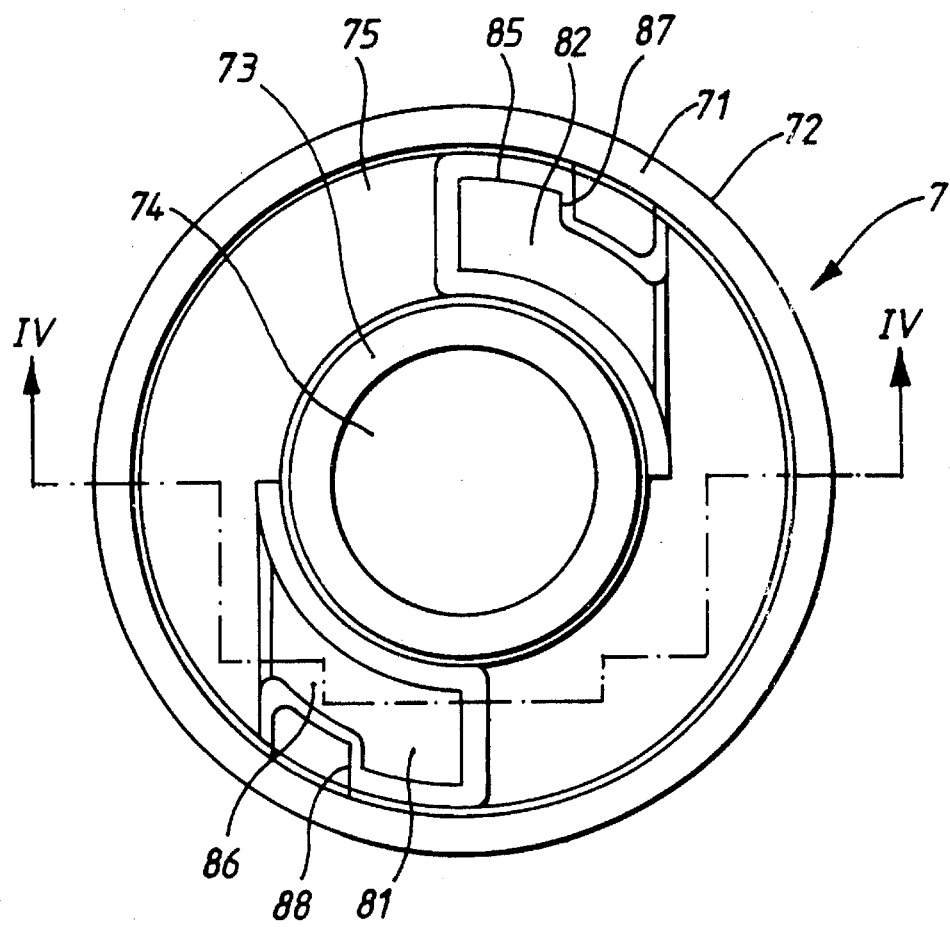
FIG. 3 is a plan view of a braking disk which functions between the spool and backplate.

FIGS. 3 and 4 show the braking wheel 7 and its installation. This embodiment uses a one-piece molding in tough engineering plastics e.g. Delrin®. An outer cylindrical annulus 71 provides a peripheral cylindrical braking surface 72. An inner, concentric cylindrical annulus 73 surrounds an inner bore 74 which in use fits closely but freely rotatably over the boss 15 of the backplate 1. A flat intermediate web portion 75 joins the inner and outer annuli 71,73 integrally. A pair of pawls 81,82 are formed as permanently bent-out integral portions of the intermediate web 75. They project in opposite axial directions, as seen in FIG. 4, and are diametrically opposite. Each pawl has an enlarged head portion 85 and a thinner neck portion 86 connecting the head portion to the main part of the web 75. Underlying or surrounding each pawl 81,82 is an opening in the web 75, of corresponding shape but slightly larger than the pawl. This provides clearance for the pawl to flex axially. The head 85 of each pawl has a rearwardly-facing shoulder portion 87 opposing a forwardly-facing shoulder portion 88 of the underlying cut-out. These shoulder portions 87,88 abut if the pawl is subjected to large circumferential forces, preventing possible damaging buckling of the pawls.

In this embodiment only two pawls are shown, one for each side. It may be desired to provide more pawls e.g. four in total with a diametrically-opposed pair projecting on each face of the wheel 7, if there is any tendency for the wheel to tilt under load.

In the assembly, the brake wheel bore 74 fits over the body boss and the spool is assembled on top as shown in FIG. 4. When the spool turns anti-clockwise, the head of the lower pawl 81 engages a backplate tooth 2, while the upward pawl 82 is repeatedly depressed and clicks past i.e. rides over the spool ribs 4 without substantial resistance, by flexion of its neck 86. When the spool is turned clockwise, the lower pawl 81 rides over the backplate ribs 2 with repeated flexion and clicks, while the upper pawl 82 engages a spool rib 4 and the wheel 7 is constrained to rotate with the spool 3. The outer surface 72 of the wheel 7 is thereby rotated in contact with the brake shoes 5,52, thus braking the spool.

It will be noted that the non-constrained pawl clicks in both senses of rotation. By having different characteristics of the spool ribs and backplate ribs, these clicks can be made characteristic to help the user. Thus, in the present embodiment the shorter, more numerous spool ribs lead to a quieter, faster click when winding in, compared to a louder slower click as line is stripped from the spool.

It should be understood that the braking mechanism shown is only one possibility for a spool rotation control arrangement. The periphery of the wheel 7 might be toothed and subject directly to a strongly-sprung clicking pawl for braking. Or, the clicker engagement of the pawl against the backplate ribs 2 may be the only spool control arrangement.

It will readily be understood that by taking off the spool, removing, inverting and replacing the braking wheel 7, the upward and downward pawls point in respective rotational directions opposite to those described above so that the senses of rotation for the two types of spool behaviour are switched over. Because the braking wheel is made all in one piece, and the only relative movements between its parts are integral bending movements, it is very easy to handle and cannot fall apart.

Figure 5:
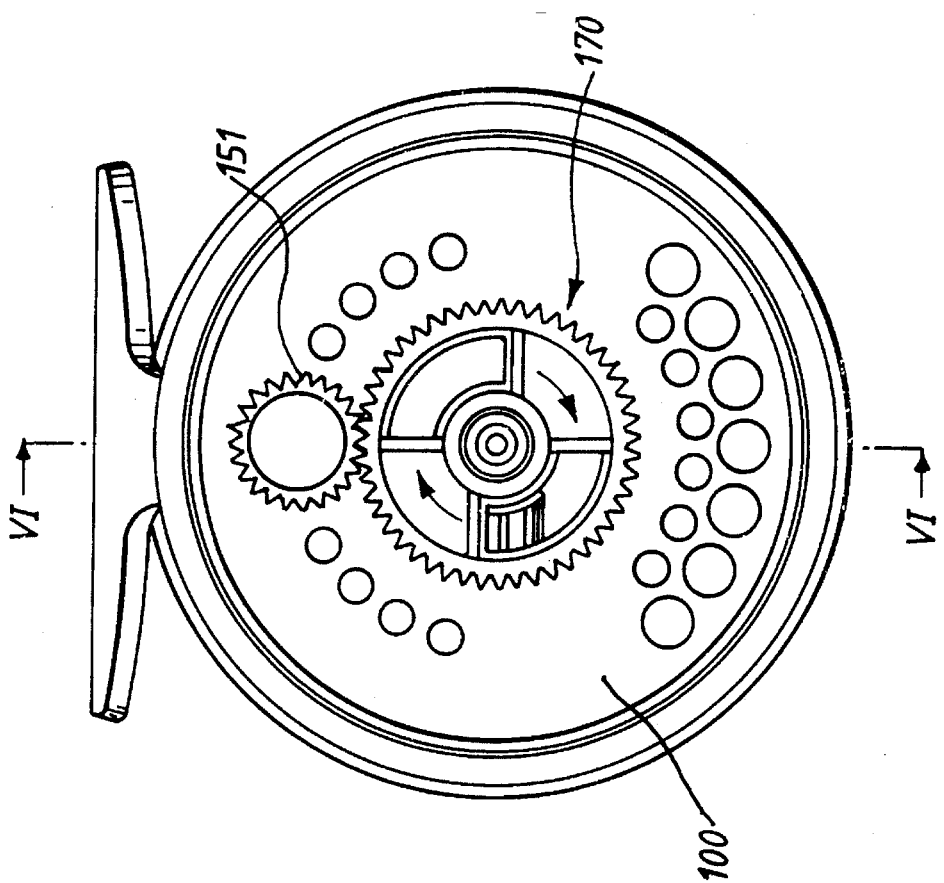
FIG. 5 is a front view of the interior of a fishing reel backplate in a second embodiment.

FIGS. 5 to 9 illustrate a second preferred embodiment. FIG. 5 gives a general front view of the backplate 100 with a braking wheel 170, different from the first embodiment, in place. In this embodiment braking is provided by an eccentrically-positioned brake device 150, having a toothed wheel 151 exposed at the interior of the backplate 100 and subject to a manually-lightenable adjusting knob 152 creating progressively greater frictional resistance to rotation of the toothed wheel 151. Braked wheels of this type are well known as such, and no further description need be given here of the frictional adjustment mechanism.

The main brake coupling wheel 170 is a one-piece molding in engineering plastics material, as in the first embodiment. Unlike the first embodiment its outer cylindrical annulus 171 presents a toothed periphery 172 which meshes with the toothed wheel 151 of the adjustable braking device.

Figure 6:
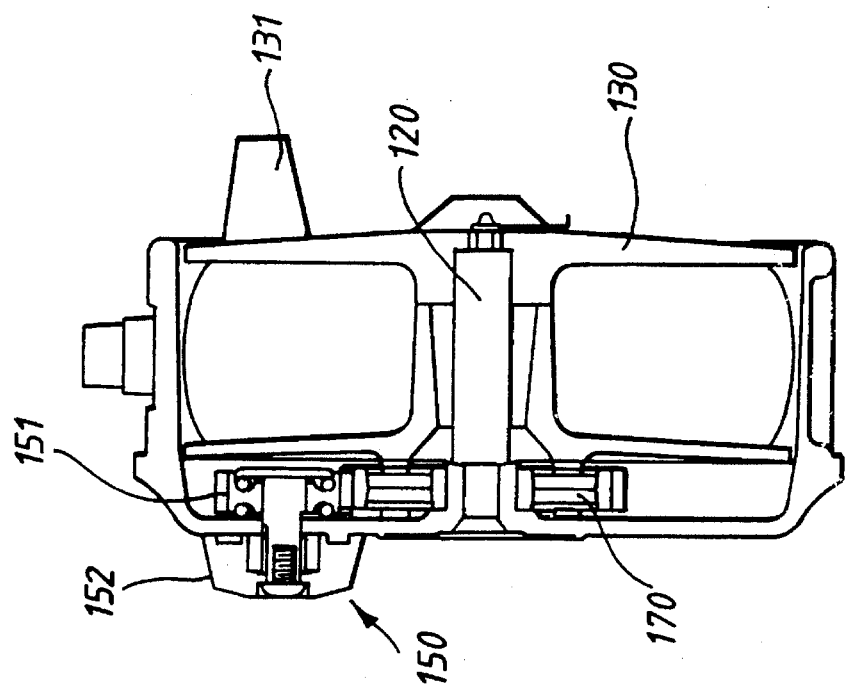
FIG. 6 is a sectional view of the complete reel of the second embodiment, at VI—VI in FIG. 5.

FIG. 6 shows other elements of the reel, in particular the spool 130 mounted on the spindle 120, with its front crank handle 131.

Figure 7:
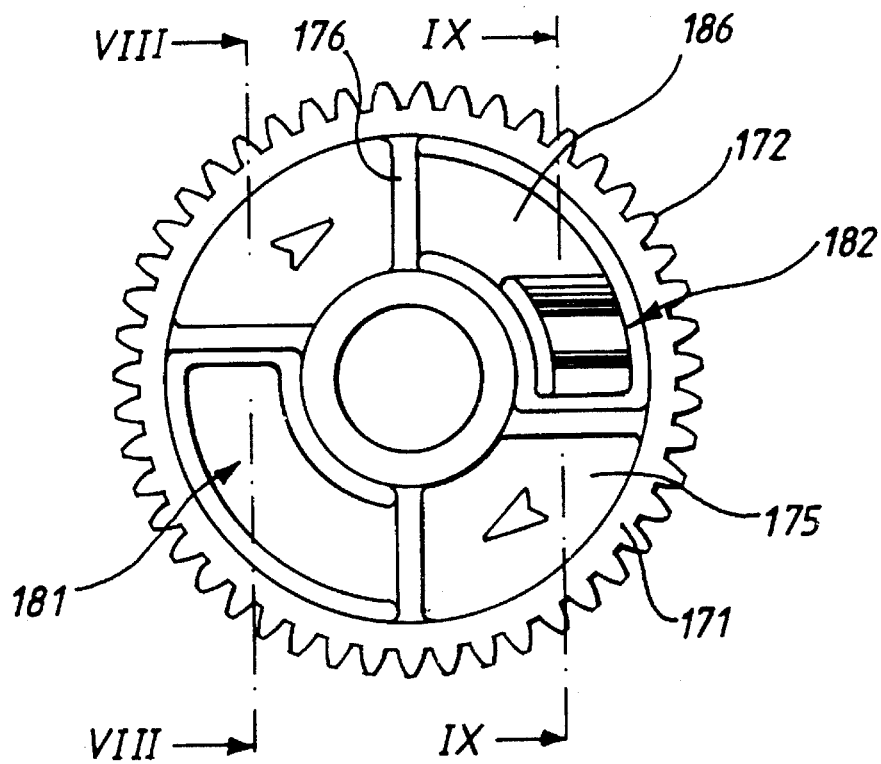
FIG. 7 is an enlarged face view of a brake coupling disk in the second embodiment.
Figures 8, 9:
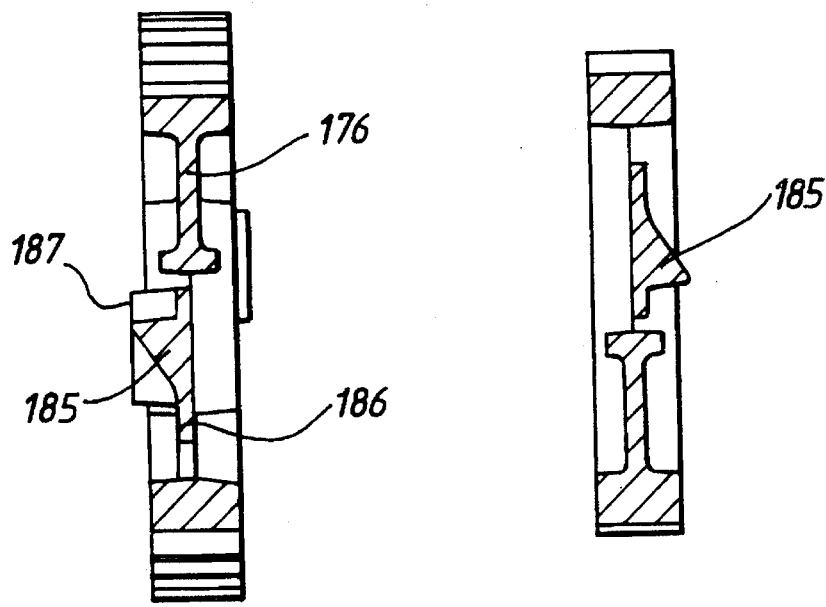
FIG. 8 is a section at VIII—VIII in FIG. 7.
FIG. 9 is a section at IX—IX in FIG. 7.
Figure 10:
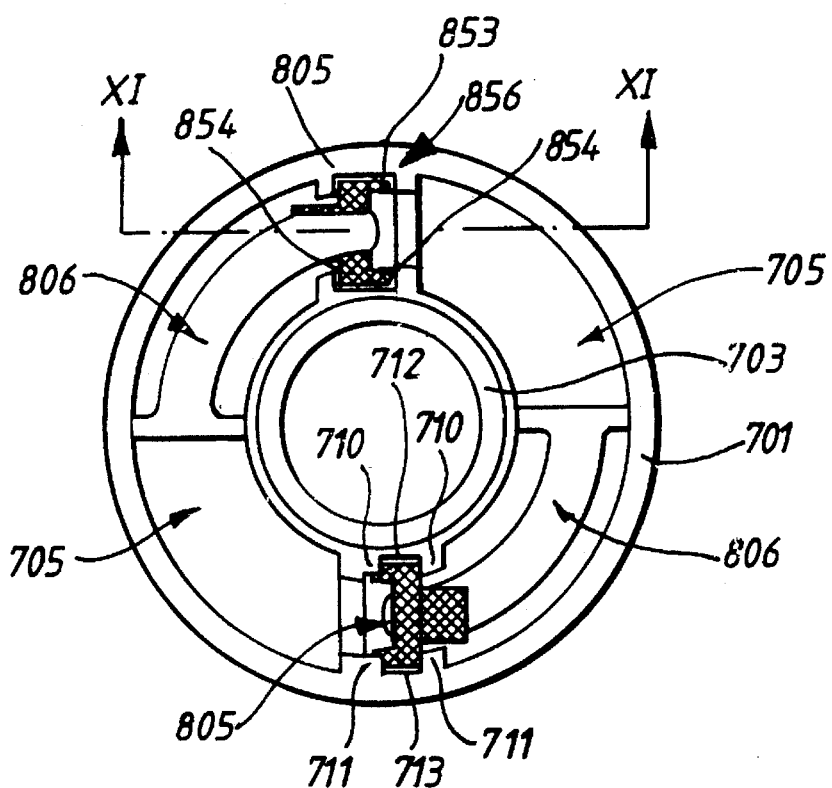
FIG. 10 is an enlarged face view of a third embodiment of brake coupling disk.
Figure 11:
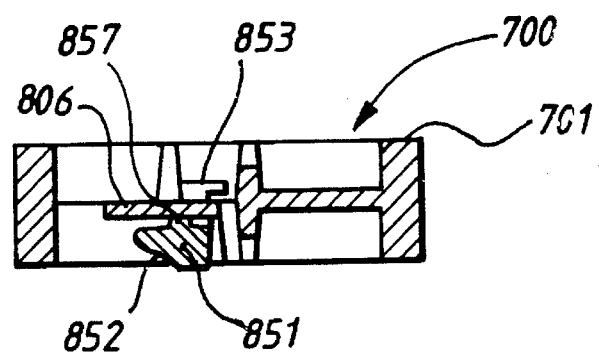
FIG. 11 is a sectional view at XI—XI in FIG. 10.

FIGS. 7 to 9 show the braking wheel 170 in greater detail. Differences from the first embodiment include division of the web portion 175 into four generally equal quadrants separated by thicker radial strengthening ribs 176. The pawls 181, 182 differ in that their neck portions 186 are molded in-plane with the rest of the web portion, the pawl's axial projection being provided essentially by the enlarged triangular tooth formation of its head portion 185. Formed integrally with each pawl head 185, alongside the tooth formation, is a stabilising ridge 187 which can exert a guiding effect when abutting an opposing surface of the reel (spool or backplate) and thereby help avoid excessive deformations of the pawl necks 186.

This conformation is easier to mold than the first embodiment. Of course, the pawl conformation described here may be used with a drum surface rather than teeth on the outer annulus of the wheel.

The remaining Figures illustrate a third embodiment in which the pawl heads are formed separately from the pawl necks.

As in the previous embodiments, the braking disk 700 has an outer cylindrical annulus 701, an inner cylindrical annulus 703 and a flat intermediate web portion 705. Two diametrically-opposed leaf springs 806, molded integrally with the web 705, are provided as flat cantilevered limbs with one free end. Each subtends roughly a quarter of the disk, i.e. they are longer and relatively more easily flexible than the short leaf springs in the first embodiment. They could not resist buckling due to circumferential pawl forces. In this embodiment, the leaf springs are molded in-plane with the web 705.

Each leaf spring 806 acts on a respective pawl head 805. The pawl heads 805 are separately-molded one-piece entities having a pawl portion 851 (with an oblique pawl surface 852) and a guide portion, here formed as two guide projections 853,854 projecting from either side of the pawl portion 851.

At the free end of each leaf spring 806 the inner and outer annuli 701,703 of the element body have opposed radial projections 710,711 defining opposed guiding channels 712, 713, extending axially, in which the guide projections 853, 854 of the pawl heads 805 fit with little play. Each guide channel has an axially-facing abutment projection which the guide portions 853,854 cannot pass because of lugs 856 formed on them. The guide portions 853,854 themselves are axially elongate, to guide axial movements of the pawl heads 805 in their respective guide recesses, defined between the guiding channels 712,713.

The two pawl heads 805 face in axially opposite directions. Each pawl head 805 is trapped in position by engagement of the end of the leaf spring 806 over the pawl portion 851, locating between the upwardly-projecting guide portions 853,854 and urging the projecting lugs 856 towards the limiting abutments. The pawl head 805 can be removed only by deliberately lifting the leaf spring 806.

The top of each pawl portion has a rounded projection 857 which rests against the plain surface of the leaf spring to allow a relative rocking of the pawl head, so that it can move essentially linearly, followed by the pivotally-moving leaf spring, without forcing local deformations of the leaf spring adjacent the head as might occur if they were directly fixed together.

The coupling element body including the leaf springs is a one-piece molding in tough engineering plastics e.g. Delrin®. The pawl heads 805 are themselves one-piece molding of similar material.

What is claimed is:

1. A rotatable-spool fishing reel comprising a reel body having a backplate;

a spindle projecting in an axial forward direction from the backplate;

a line spool mounted for rotation on the spindle, the line spool having a front and a back;

a manual crank arrangement provided at the front of the line spool and connected thereto to enable rotation thereof by hand;

at least one spool coupling abutment provided on the back of the line spool and fixed to rotate with it;

an invertible coupling element disposed between the back of the line spool and the backplate, the invertible coupling element being mounted on the spindle rotatably relative to the backplate and rotatably relative to the line spool, having first and second oppositely axially-directed faces and being discretely removably from and insertable in the reel for exchange between a first operative condition in which the first axially-directed face opposes the back of the like spool and a second operative condition in which the second axially-directed face opposes the back of the line spool, the invertible coupling element further comprising at least one axially resiliently-retractable and rotationally sense-selective first coupling pawl, presented on the first axially-directed face of the invertible coupling element to engage in the first operative condition the at least one spool coupling abutment on the back of the line spool whereby upon rotation of the line spool in a first rotational sense said first coupling pawl engagement constrains the invertible coupling element to rotate in unison with the spool in that first rotational sense, whereas upon rotation of the line spool in a second, opposite rotational sense resilient retraction of the at least one first coupling pawl uncouples the constraint to rotate in unison;

at least one axially resiliently-retractable and rotationally sense-selective second coupling pawl, presented on the second axially-directed face of the invertible coupling element to engage in the second operative condition the at least one spool coupling abutment on the back of the line spool whereby upon rotation of the line spool in the second rotational sense the second coupling pawl engagement constrains the invertible coupling element to rotate in unison with the line spool in that second rotational sense, whereas upon rotation of the line spool in the first rotational sense resilient retraction of the at least one second coupling pawl uncouples the constraint to rotate in unison;

the reel further comprising a spool rotation control arrangement adapted to act on the invertible control element, and thereby to influence the rotation of the line spool when the invertible control element is constrained to rotate in unison with the line spool.

2. A fishing reel as claimed in claim 1 in which the invertible coupling element has an annular periphery and the spool rotation control arrangement engages the annular periphery.

3. A fishing reel as claimed in claim 2 in which the annular periphery is toothed.

4. A fishing reel as claimed in claim 1 in which the spool rotation control arrangement comprises a brake device for applying a braking-force to the invertible coupling element to inhibit rotation thereof.

5. A fishing reel as claimed in claim 4 in which the brake device comprises adjustment means for controllably changing the braking force applied.

6. A fishing reel as claimed in claim 1 in which the invertible control element has at least one web portion, and said first and second coupling pawls each comprise an integral cantilevered limb extending both axially and circumferentially from the web portion to constitute an axially-bendable pawl spring, and a pawl head at the free end of the cantilevered limb.

7. A fishing reel as claimed in claim 6 in which the invertible control element is formed in one piece.

8. A fishing reel as claimed in claim 7 in which the invertible control element is a molding of plastics material.

9. A fishing reel as claimed in claim 6 in which the pawl heads have enlarged head abutments to inhibit buckling of the cantilevered limbs due to compression in their length direction.

10. A fishing reel as claimed in claim 1 in which the invertible coupling element is formed in one piece.

11. A fishing reel as claimed in claim 1 in which the invertible coupling element is a molding of plastics material.

12. A fishing reel as claimed in claim 1, comprising an annular series of radially-extending ribs on the back of the line spool to provide said at least one spool coupling abutment.

13. A fishing reel as claimed in claim 12 in which the ribs are symmetrical in the circumferential direction.

14. A fishing reel as claimed in claim 12 in which the ribs are formed in one piece with the line spool.

15. A fishing reel as claimed in claim 1 in which at least one backplate coupling abutment is provided on the backplate behind the invertible coupling element, said backplate coupling abutment being engaged in the first operative position by the at least one second coupling pawl of the invertible coupling element whereby upon said rotation of the invertible coupling element in unison with the line spool in said first rotational sense, resilient axial retraction of the at least one second coupling pawl enables said at least one second coupling pawl to ride over the at least one backplate coupling abutment, whereas upon rotation of the line spool in the second rotational sense the pawl engagement of the at least one second coupling pawl with the at least one backplate coupling abutment prevents rotation of the invertible coupling element in the second rotational sense, and said backplate coupling abutment further being engaged in the second operative condition by the at least one first coupling pawl of the invertible coupling element whereby upon said rotation of the invertible coupling element in unison with the line spool in said second rotational sense, resilient axial retraction of the at least one first coupling pawl causes said at least one first coupling pawl to ride over the at least one backplate coupling abutment, whereas upon rotation of the line spool in the first rotational sense the pawl engagement of the at least one first coupling pawl with the at least one backplate coupling abutment prevents rotation of the invertible coupling element in the first rotational sense.

16. A fishing reel as claimed in claim 15, comprising an annular series of radially-extending ribs on the backplate to provide said at least one backplate coupling abutment.

17. A fishing reel as claimed in claim 16 in which the ribs are symmetrical in the circumferential direction.

18. A fishing reel as claimed in claim 16 in which the ribs are formed in one piece with the backplate.

\* \* \* \* \*